(12) United States Patent
Nakahara et al.

(10) Patent No.: US 10,461,885 B2
(45) Date of Patent: Oct. 29, 2019

(54) TRANSMISSION APPARATUS, COMMUNICATION SYSTEM, AND TRANSMISSION METHOD

(71) Applicant: Sony Corporation, Tokyo (JP)

(72) Inventors: Kentaro Nakahara, Kanagawa (JP); Hideyuki Matsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 15/551,001

(22) PCT Filed: Mar. 4, 2016

(86) PCT No.: PCT/JP2016/056729
§ 371 (c)(1),
(2) Date: Aug. 14, 2017

(87) PCT Pub. No.: WO2016/147902
PCT Pub. Date: Sep. 22, 2016

(65) Prior Publication Data
US 2018/0034582 A1  Feb. 1, 2018

(30) Foreign Application Priority Data
Mar. 18, 2015  (JP) ................................ 2015-054325

(51) Int. Cl.
*G06F 1/26* (2006.01)
*G06F 1/32* (2019.01)
(Continued)

(52) U.S. Cl.
CPC .......... *H04L 1/0023* (2013.01); *G06F 1/3203* (2013.01); *G08C 17/06* (2013.01);
(Continued)

(58) Field of Classification Search
CPC ..................................................... H04L 1/0023
See application file for complete search history.

(56) References Cited

U.S. PATENT DOCUMENTS 3,564,290 A * 2/1971 Sonoda ................ H03K 19/096
257/300
5,608,762 A * 3/1997 Maddy ................. H04L 25/063
329/319
(Continued)

FOREIGN PATENT DOCUMENTS

| JP | 07-191297 A | 7/1995 |
| JP | 5049982 B2 | 10/2012 |
| JP | 2013-187584 A | 9/2013 |

*Primary Examiner* — Mohammed H Rehman
(74) *Attorney, Agent, or Firm* — Michael Best & Friedrich LLP (57) ABSTRACT

The present technology relates to a communication system, and a transmission method that a restoration time from a state that a transmission of a signal between AC-coupled apparatuses is suspended can be shortened without increasing a power consumption.

A first control signal is transmitted via the second signal line in a case where a transmission of the signal via the first signal line is restored from a suspended state, and that a transmission of a charging signal that charges an AC coupling capacitance serially connected to the first signal line via the first signal line is started before a timing when the transmission of the first control signal is ended. The present technology is applicable, for example, to a communication system in conformity with the eDP standard.

19 Claims, 4 Drawing Sheets

(51) Int. Cl.
*H04L 1/00* (2006.01)
*H04B 3/50* (2006.01)
*G06F 1/3203* (2019.01)
*G08C 17/06* (2006.01)
*H04B 3/04* (2006.01)
*H04L 25/02* (2006.01)

(52) U.S. Cl.
CPC ................. *H04B 3/04* (2013.01); *H04B 3/50* (2013.01); *H04L 25/0272* (2013.01)

(56) References Cited

U.S. PATENT DOCUMENTS

| 9,985,664 B2* | 5/2018 | Subramanian ....... G06K 7/0008 |
| 2010/0026086 A1* | 2/2010 | Siegel .................... H04B 3/548 |
| | | 307/2 |
| 2012/0008626 A1* | 1/2012 | Brederveld .......... G06Q 10/087 |
| | | 370/392 |

* cited by examiner

TRANSMISSION APPARATUS, COMMUNICATION SYSTEM, AND TRANSMISSION METHOD

TECHNICAL FIELD

The present technology relates to a transmission apparatus, a communication system, and a transmission method and, more particularly to a transmission apparatus, a communication system, and a transmission method that a restoration time from a state that a transmission of a signal between AC-coupled apparatuses is suspended can be shortened without increasing a power consumption.

BACKGROUND ART

In the related art, it is proposed that, between AC-coupled apparatuses, charges are fed from a potential setting unit before transmitting a differential signal such that a signal line pair has stable potential, and dummy pattern data is transmitted until an amplitude of a differential signal reaches a specified amplitude value (for example, see Patent Literature 1).

In addition, the Embedded DisplayPort (hereinafter referred to as eDP) standard, which becomes popular in recent years, has a function of Advanced Link Power Management (ALPM). The ALPM is a function to decrease a power consumption by suspending transmission processing of a Main Link when no transmission data is present.

Here, the Main Link is a channel mainly used for a transmission of data to be processed in each apparatus among a plurality of channels for a signal transmission between apparatuses.

In the ALPM, an AUX_PHY_WAKE signal is transmitted from a transmission side to a reception side via an AUX CH separately provided from the Main Link before the transmission of a Main Link signal is restarted. The reception side restarts reception processing of the Main Link triggered by the reception of the AUX_PHY_WAKE signal.

Here, the AUX CH is a channel mainly used for a transmission of a control signal among the plurality of channels for the signal transmission between the apparatuses.

Incidentally, AC coupling is used for connecting the Main Link between the apparatuses in conformity with the eDP standard. Accordingly, in a case where transmission processing of the Main Link is restarted, it is necessary to sufficiently charge a capacitance (e.g., capacitor) for the AC coupling and to stabilize the potential of signal lines of the Main Link, for example, using the method described in Patent Literature 1.

CITATION LIST

Patent Literature

Patent Literature 1: Japanese Patent No. 5049982

DISCLOSURE OF INVENTION

Technical Problem

However, the ALPM requires that the reception side is restored to have a receivable state of the Main Link signal within 20 p seconds after the transmission of the AUX_PHY_WAKE signal. However, as described above, a time to charge an AC coupling capacitance and to stabilize the potential of the signal lines of the Main Link is necessary after the transmission of the AUX_PHY_WAKE signal. Therefore, it may be difficult to satisfy the above-described requirement.

On the other hand, in order to prevent this, it is conceivable to maintain potential of the signal lines of the Main Link at predetermined potential using a DC bias circuit even during a suspension period of the transmission processing. However, the power consumption is increased for operating the DC bias circuit.

In this regard, it is an object of the present technology to shorten a restoration time from a state that a transmission of a signal between AC-coupled apparatuses without increasing a power consumption.

Solution to Problem

A transmission apparatus according to a first aspect of the present technology includes a communication unit that transmits a signal via a first signal line and a second signal line to a reception apparatus, the reception apparatus being AC-coupled via the first signal line, and a communication control unit that controls transmission of the signal to the reception apparatus, the communication control unit controlling such that a first control signal is transmitted via the second signal line in a case where a transmission of the signal via the first signal line is restored from a suspended state, and that a transmission of a charging signal that charges an AC coupling capacitance serially connected to the first signal line via the first signal line is started before a timing when the transmission of the first control signal is ended.

The communication control unit may control such that a second control signal is transmitted via the first signal line before the transmission of the signal via the first signal line is suspended.

The transmission apparatus and the reception apparatus may perform transmission of a signal in accordance with an Embedded DisplayPort standard, the first control signal is an AUX_PHY_WAKE signal, and the second control signal is an ML_PHY_SLEEP signal or an ML_PHY_STANDBY signal.

The communication control unit may start transmissions of the first control signal and the charging signal at the same time.

The communication control unit may start the transmission of the charging signal before a predetermined time to start the transmission of the first control signal or after a predetermined time from the start of the transmission of the first control signal.

The communication control unit may end the transmissions of the first control signal and the charging signal at the same time.

A bias circuit that maintains potential of the first signal line at a transmission apparatus side from the capacitance at predetermined potential may be further included, the bias circuit suspending an operation during a downtime of the transmission of the signal via the first signal line.

The first signal line may be constituted of a pair of two signal lines, and the communication unit may transmit a differential signal via the first signal line.

The capacitance may be further included.

A transmission method according to a second aspect of the present technology, by a transmission apparatus connected to a reception apparatus via a first signal line and a second signal line and AC-coupled to the reception apparatus via the first signal line, includes transmitting a predetermined control signal via the second signal line in a case where a transmission of the signal via the first signal line is restored from a suspended state, and starting a transmission of a charging signal that charges an AC coupling capacitance serially connected to the first signal line via the first signal line before a timing when the transmission of the control signal is ended.

A communication system according to a third aspect of the present technology includes a transmission apparatus, and a reception apparatus connected to the transmission apparatus via a first signal line and a second signal line and AC-coupled to the transmission apparatus via the first signal line, the transmission apparatus including a communication unit that transmits a signal via a first signal line and a second signal line to the reception apparatus, and a communication control unit that controls transmission of the signal to the reception apparatus, the communication control unit controlling such that a first control signal is transmitted via the second signal line in a case where a transmission of the signal via the first signal line is restored from a suspended state, and that a transmission of a charging signal that charges an AC coupling capacitance serially connected to the first signal line via the first signal line is started before a timing when the transmission of the first control signal is ended.

According to the first aspect of the present technology, a first control signal is transmitted via the second signal line in a case where a transmission of the signal via the first signal line is restored from a suspended state, and that a transmission of a charging signal that charges an AC coupling capacitance serially connected to the first signal line via the first signal line is started before a timing when the transmission of the first control signal is ended.

According to the second aspect or the third aspect of the present technology, a predetermined control signal is transmitted via the second signal line in a case where a transmission of the signal via the first signal line is restored from a suspended state, and that a transmission of a charging signal that charges an AC coupling capacitance serially connected to the first signal line via the first signal line is started before a timing when the transmission of the predetermined control signal is ended.

Advantageous Effects of Invention

According to the aspects of the present technology, a restoration time from a state that a transmission of a signal between AC-coupled apparatuses is suspended can be shortened without increasing a power consumption.

MODE(S) FOR CARRYING OUT THE INVENTION

Hereinafter, modes (hereinafter referred to as embodiments) for carrying out the present technology will be described. The embodiments of the present technology will be described in the following order.
1. First Embodiment
2. Second Embodiment
3. Modification 1. First Embodiment First, referring to FIG. 1 to FIG. 3, a first embodiment of the present technology will be described.

[Configuration Example of Communication System 11]

Figure 1:
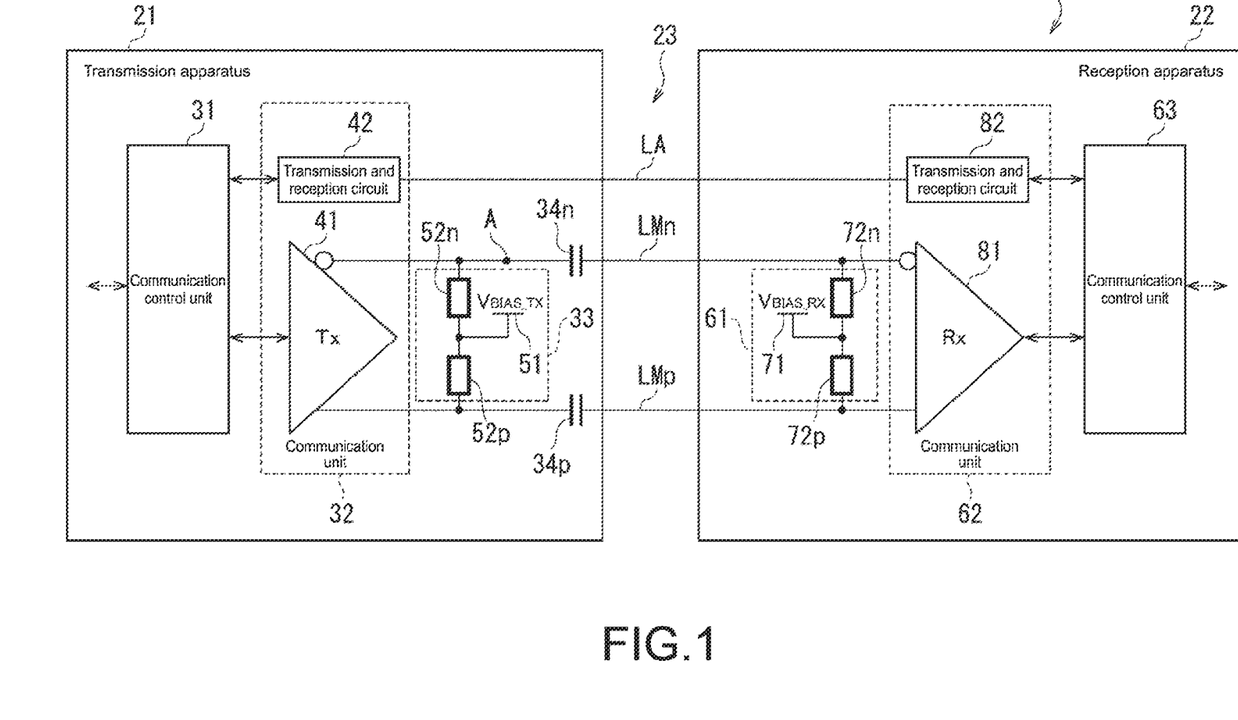
FIG. 1 is a block diagram showing a communication system according to a first embodiment to which the present technology is applied.

FIG. 1 shows a configuration example of a communication system 11 according to the first embodiment of the present technology.

The communication system 11 is a system that performs a transmission of data in conformity with the eDP standard. The communication system 11 is configured to include the transmission apparatus 21 and the reception apparatus 22. The transmission apparatus 21 and the reception apparatus 22 are connected via connection cables 23. The connection cables 23 include at least parts of a signal line LMp, a signal line LMn, and a signal line LA. The signal line LMp and the signal line LMn are paired, and are used for a transmission of a Main Link signal. The signal line LA is used for a transmission of an AUX CH signal.

As described above, the Main Link is a channel mainly used for the transmission of data to be processed by each apparatus. Also, the AUX CH is a channel mainly used for a transmission of a control signal.

The transmission apparatus 21 is configured to include a communication control unit 31, a communication unit 32, a DC bias circuit 33, and capacitances 34p and 34n.

The communication control unit 31 acquires data to be transmitted to the reception apparatus 22 from each unit (not shown) of the transmission apparatus 21 or an external apparatus. In addition, the communication control unit 31 performs control of a transmission of the Main Link signal by a driver 41, e.g., controls such that a signal including the acquired data is transmitted to the reception apparatus 22. Furthermore, the communication control unit 31 performs control of a transmission and a reception of the AUX CH signal by a transmission and reception circuit 42.

The communication unit 32 is configured to include the driver 41 and the transmission and reception circuit 42.

A positive side terminal of the driver 41 is connected to a positive side terminal of a receiver 81 of the reception apparatus 22 via the signal line LMp. A negative side terminal of the driver 41 is connected to a negative side terminal of the receiver 81 of the reception apparatus 22 via the signal line LMn. The driver 41 converts a Main Link digital signal fed from the communication control unit 31 into a differential signal, and transmits the converted differential signal to the reception apparatus 22 via the signal line LMp and the signal line LMn.

The transmission and reception circuit 42 is connected to a transmission and reception circuit 82 of the reception apparatus 22 via the signal line LA. The transmission and reception circuit 42 transmits and receives the AUX CH signal to/from the transmission and reception circuit 82 via the signal line LA under the control of the communication control unit 31.

Note that only one signal line LA is shown in FIG. 1, but it is possible to use two signal lines LA. Also, the transmission and reception circuit 42 can be AC-coupled to the transmission and reception circuit 82. Furthermore, the AUX CH signal transmitted between the transmission and reception circuit 42 and the transmission and reception circuit 82 may be any of a differential signal or a single end signal.

The DC bias circuit 33 is configured to include a power source 51 and resistances 52p and 52n. The resistance 52p and the resistance 52n are serially connected between the signal line LMp and the signal line LMn. The power source 51 is connected between the resistance 52p and the resistance 52n. The DC bias circuit 33 sets potential of the signal line LMp at a driver 41 side from a capacitance 34p and potential of the signal line LMn at the driver 41 side from a capacitance 34n (hereinafter referred to as transmission side potential) at predetermined potential with a voltage $V_{BIAS\_TX}$ applied from the power source 51, and maintains the potential.

The capacitances 34p and 34n are formed of capacitors, for example. The capacitance 34p is serially connected to the signal line LMp, and the capacitance 34n is serially connected to the signal line LMn. The capacitances 34p and 34n constitute a capacitance pair that AC-couples between the transmission apparatus 21 and the reception apparatus 22.

The reception apparatus 22 is configured to include a DC bias circuit 61, a communication unit 62, and a communication control unit 63.

The DC bias circuit 61 is configured to include a power source 71 and resistances 72p and 72n. The resistance 72p and the resistance 72n are serially connected between the signal line LMp and the signal line LMn. The power source 71 is connected between the resistance 72p and the resistance 72n. The DC bias circuit 61 sets potential of the signal line LMp and the signal line LMn at predetermined potential in the reception apparatus 22 with the voltage $V_{BIAS\_RX}$ applied from the power source 71, and maintains the potential.

The communication unit 62 is configured to include a receiver 81 and a transmission and reception circuit 82.

The receiver 81 converts a Main Link differential signal transmitted from the transmission apparatus 21 via the signal line LMp and the signal line LMn, and feeds the Main Link differential signal to the communication control unit 63.

The transmission and reception circuit 82 transmits and receives the AUX CH signal to/from the transmission and reception circuit 42 via the signal line LA under the control of the communication control unit 63.

The communication control unit 63 controls the reception of the Main Link signal by the receiver 81. Also, the communication control unit 63 feeds the data included in the received Main Link signal to each unit of the reception apparatus 22 or an external apparatus, as necessary. Furthermore, the communication control unit 63 controls the transmission and the reception of the AUX CH signal by the transmission and reception circuit 82.

[ALPM Processing of Communication System 11]

Figure 2:
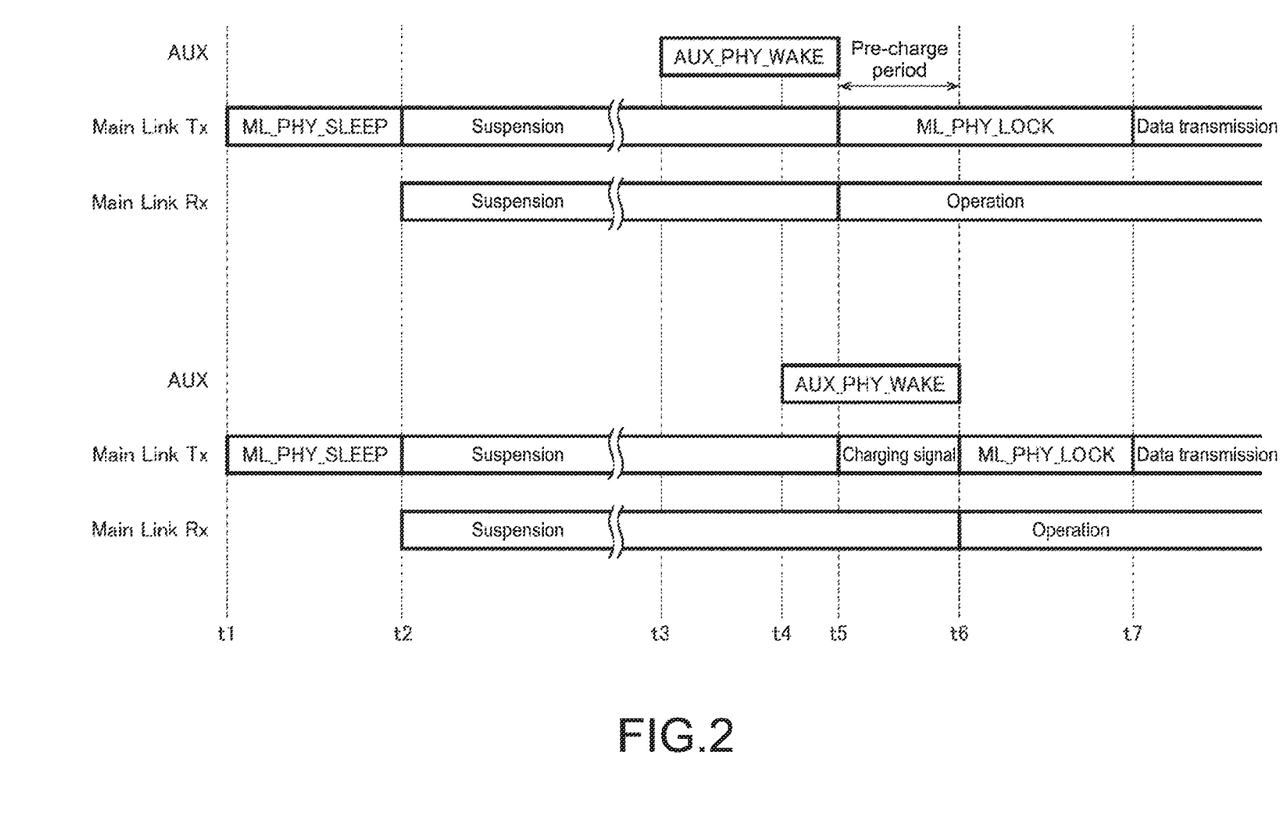
FIG. 2 is timing charts for illustrating ALPM processing by the communication system.

Next, referring to a timing chart of FIG. 2, ALPM processing of the communication system 11 will be described. An upper timing chart of FIG. 2 is a timing chart when the communication system 11 performs ALPM processing in the related art. A lower timing chart of FIG. 2 is a timing chart when the communication system 11 performs ALPM processing to which the present technology is applied.

Note that, as described above, the ALPM is a function to decrease a power consumption by suspending transmission processing of the Main Link when no transmission data is present in the eDP.

In addition, the AUX row represents a timing chart of the AUX CH signal. The Main Link Tx row represents a timing chart of an operation of the transmission apparatus 21 on the Main Link. The Main Link Rx row represents a timing chart of an operation of the reception apparatus 22 on the Main Link.

First, referring to the upper timing chart of FIG. 2, processing of the communication system 11 will be described in a case where the ALPM processing in the related art is performed.

In a case where there are no data to be transmitted to the reception apparatus 22 and Main Link processing is suspended, the communication control unit 31 of the transmission apparatus 21 transmits the ML_PHY_SLEEP signal to the reception apparatus 22 via the driver 41 and the signal lines LMp and LMn at time t1.

The ML_PHY_SLEEP signal notifies that the transmission apparatus 21 suspends the Main Link processing and transits to a sleep state.

Next, the transmission apparatus 21 ends the transmission of the ML_PHY_SLEEP signal at time t2, and suspends the Main Link processing. For example, the transmission apparatus 21 suspends the driver 41, and suspends the transmission of the Main Link signal. Also, the transmission apparatus 21 turns off the power source 51 of the DC bias circuit 33, and suspends the operation of the DC bias circuit 33, for example.

On the other hand, the reception apparatus 22 suspends the Main Link processing at time t2 after receiving the ML_PHY_SLEEP signal. For example, the reception apparatus 22 suspends the receiver 81, and suspends the reception of the Main Link signal. Note that the DC bias circuit 61 continues the operation without suspended.

In this manner, Main Link transmission processing between the transmission apparatus 21 and the reception apparatus 22 is suspended.

Thereafter, the communication control unit 31 of the transmission apparatus 21 starts the transmission of the AUX_PHY_WAKE signal to the reception apparatus 22 via the transmission and reception circuit 42 and the signal line LA in a case where the Main Link processing is restored from a suspended state and the transmission of data is restarted at time t3.

The AUX_PHY_WAKE signal notifies that the transmission apparatus 21 is restored from the suspended state (e.g., sleep state or standby state) and the transmission of the Main Link signal is restarted.

Next, the transmission apparatus 21 ends the transmission of the AUX_PHY_WAKE signal and restarts the Main Link processing at time t5. For example, the transmission apparatus 21 reboots the driver 41, turns on the power source 51 of the DC bias circuit 33, and reboots the DC bias circuit 33. In addition, the communication control unit 31 starts the transmission of an ML_PHY_LOCK signal to the reception apparatus 22 via the driver 41 and signal lines LMp and LMn.

The ML_PHY_LOCK signal is a signal that shows a predetermined training pattern, and is used as a preparation for a transmissible state of the Main Link signal, e.g., synchronization between the transmission apparatus 21 and the reception apparatus 22.

On the other hand, the reception apparatus 22 restarts the Main Link processing after receiving the AUX_PHY_WAKE signal at time t5. For example, the reception apparatus 22 reboots the receiver 81. In addition, the reception apparatus 22 prepares for the reception of the Main Link signal, e.g., synchronizes with the transmission apparatus 21 (hereinafter referred to as reception preparation processing) on the basis of the ML_PHY_LOCK signal from the transmission apparatus 21. Then, after the reception preparation processing is completed, the reception apparatus 22 restores to a receivable state of the Main Link signal from the transmission apparatus 21.

Next, the transmission apparatus 21 ends the transmission of the ML_PHY_LOCK signal, and starts the transmission of the data at time t7. For example, the communication control unit 31 firstly transmits an Idle pattern to the reception apparatus 22 via the driver 41 and the signal lines LMp and LMn, and subsequently transmits a signal including the data to be processed to the reception apparatus 22.

On the other hand, after receiving the AUX_PHY_WAKE signal, the reception apparatus 22 starts to receive the data at time t7.

Here, while the transmission apparatus 21 suspends the Main Link processing, the power source 51 of the DC bias circuit 33 is turned off. Accordingly, the capacitances 34p and 34n are discharged, and the transmission side potential of the signal lines LMp and LMn is decreased to a ground level. Thereafter, if the Main Link processing is restarted, it takes a while to store sufficient charges in the capacitances 34p and 34n, and restore the transmission side potential to the predetermined potential. Furthermore, while the transmission side potential is restored to the predetermined potential, the Main Link signal transmitted by the transmission apparatus 21 is not stabilized and may be processed as an invalid signal at the reception apparatus 22.

Figure 3:
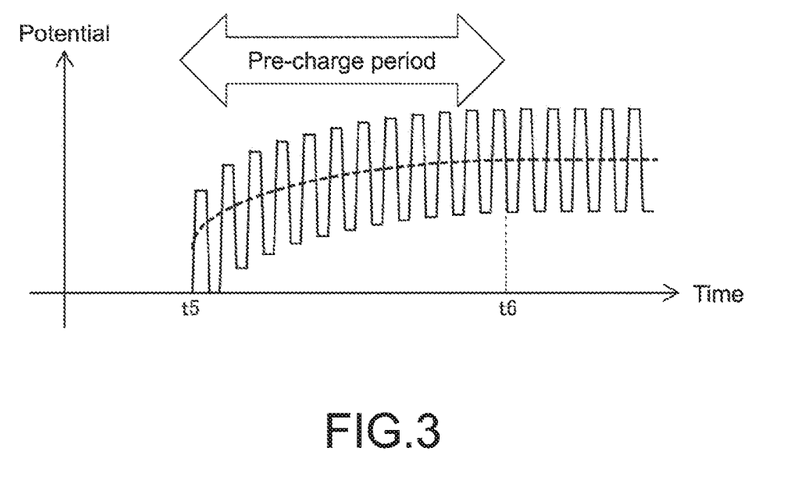
FIG. 3 is a diagram for illustrating a pre-charge period.

For example, FIG. 3 shows a potential change at point A of FIG. 5 at time t5 after the transmission apparatus 21 starts to transmit the ML_PHY_LOCK signal. Note that the point A is present between the DC bias circuit 33 and the capacitance 34n on the signal line LMn. In addition, the dotted line of FIG. 3 shows a transition of the potential of the amplitude center of the waveform of the ML_PHY_LOCK signal, i.e., the transmission side potential (DC bias potential) at the point A.

At the time point of restarting the Main Link processing at time t5, the transmission side potential is decreased to the ground level. Thereafter, when the transmission of the ML_PHY_LOCK signal is started at time t5, the capacitance 34n is gradually charged by the ML_PHY_LOCK signal. Along with this, the transmission side potential at the point A is gradually increased, the transmission side potential reaches the predetermined potential at time t6. During the period from the start of the transmission of the ML_PHY_LOCK signal at time t5 to the reach of the transmission side potential to the predetermined potential at time t6 (hereinafter referred to as a pre-charge period), the transmission side potential is lower than the predetermined potential.

Accordingly, the ML_PHY_LOCK signal transmitted from the transmission apparatus 21 during the pre-charge period is not stabilized, and the reception apparatus 22 may process the signal as an invalid signal. In addition, at the time t6 when the pre-charge period is ended, the ML_PHY_LOCK signal transmitted from the transmission apparatus 21 is finally stabilized, and the reception apparatus 22 may start the reception preparation processing on the basis of the ML_PHY_LOCK signal. Therefore, it is necessary to prolong a transmission period of the ML_PHY_LOCK signal for the time of the pre-charge period, so that the reception apparatus 22 can reliably perform the reception preparation processing on the basis of the ML_PHY_LOCK signal.

On the other hand, as described above, it is necessary to restore the reception side to the receivable state of the Main Link signal within 20μseconds after the transmission of the AUX_PHY_WAKE signal is ended in the ALPM.

However, the start of the reception preparation processing of the reception apparatus 22 may be delayed at most for the time of the pre-charge period from the start of the transmission of the ML_PHY_LOCK signal. Therefore, it may be difficult to restore the reception apparatus 22 to the receivable state of the Main Link signal within 20 p seconds after the transmission of the AUX_PHY_WAKE signal is transmitted.

Next, referring to the lower timing chart of FIG. 2, the ALPM processing of the communication system 11, to which the present technology is applied, will be described.

The processing from time t1 to time t2 is similar to the above-described processing in the related art.

Thereafter, the communication control unit 31 of the transmission apparatus 21 starts the transmission of the AUX_PHY_WAKE signal to the reception apparatus 22 via the transmission and reception circuit 42 and the signal line LA at time t4 predetermined time after time t3. The time duration between the time t3 and the time t4 is set to the same time duration as the pre-charge period.

Next, the communication control unit 31 of the transmission apparatus 21 restarts the Main Link processing at time t5. For example, the transmission apparatus 21 reboots the driver 41, turns on the power source 51 of the DC bias circuit 33, and reboots the DC bias circuit 33. In addition, the communication control unit 31 starts the transmission of the charging signal via the driver 41 and the signal lines LMp and LMn before the timing when the transmission of the AUX_PHY_WAKE signal is ended and before the ML_PHY_LOCK signal is transmitted. As the charging signal, a signal having a pattern similar to that of the ML_PHY_LOCK, the TPS1 signal, the TPS2 signal, the TPS3 signal, or the TPS4 signal each showing a variety of training patterns of the signal eDP standard, or a DC signal can be used, for example.

The charging signal is continued to be transmitted until time t6. Note that the time duration between time t5 and time t6 is set to the pre-charge period or longer. Accordingly, at time t6 when the transmission of the charging signal is ended, the capacitances 34p and 34n are sufficiently charged, and the transmission side potential of the signal lines LMp and LMn will reaches the predetermined potential.

Note that, for example, the communication control unit 31 may start the transmission of the charging signal and the AUX_PHY_WAKE signal at the same time. Also, for example, the communication control unit 31 may start the transmission of the charging signal before the transmission of the AUX_PHY_WAKE signal. Furthermore, for example, a time difference between the time to start the transmission of the AUX_PHY_WAKE signal and the time to start the transmission of the charging signal may be set by a resistor or the like.

In addition, the eDP standard does not particularly care about the state of the Main Link of the transmission apparatus 21 before ending the transmission of the AUX_PHY_WAKE signal. Therefore, transmitting the charging signal before ending the transmission of the AUX_PHY_WAKE signal does not contravene the eDP standard.

Next, the communication control unit 31 of the transmission apparatus 21 ends the transmission of the AUX_PHY_WAKE signal and the charging signal, and starts to transmit the ML_PHY_LOCK signal to the reception apparatus 22 via the driver 41 and the signal lines LMp and LMn at time t6.

On the other hand, the reception apparatus 22 restarts the Main Link processing after ending the reception of the AUX_PHY_WAKE signal at time t6. For example, the reception apparatus 22 reboots the receiver 81. In addition, the reception apparatus 22 performs the reception preparation processing, e.g., synchronizes with the transmission apparatus 21 on the basis of the ML_PHY_LOCK signal from the transmission apparatus 21. Then, after the reception preparation processing is completed, the reception apparatus 22 restores to the receivable state of the Main Link signal from the transmission apparatus 21.

Here, since the transmission side potential of the transmission apparatus 21 already reaches the predetermined potential at the time point of time t6, the ML_PHY_LOCK signal transmitted from the transmission apparatus 21 will be in a stabilized state from the start. Accordingly, the reception apparatus 22 can immediately start the reception preparation processing at the time point of starting the reception of the ML_PHY_LOCK signal. As a result, the time necessary to restore the receivable state of the Main Link reception signal by the reception apparatus 22 is shortened.

Next, the communication control unit 31 of the transmission apparatus 21 ends the transmission of the ML_PHY_LOCK signal and starts the transmission of the data via the driver 41 and the signal lines LMp and LMn at time t7. On the other hand, the reception apparatus 22 starts the reception of the data from the transmission apparatus 21.

As described above, the time necessary to restore the receivable state of the Main Link reception signal by the reception apparatus 22 can be shortened. As a result, the requirement of the eDP standard can be satisfied that the reception side is restored to have the receivable state of the Main Link signal within 20 μseconds after the transmission of the AUX_PHY_WAKE signal.

Also, a timing to transmit the AUX_PHY_WAKE signal and a timing to start the Main Link processing by the reception apparatus 22 can be delayed. Accordingly, a period of suspending the Main Link processing by the reception apparatus 22 can be prolonged and a power consumption can be decreased.

Furthermore, since the operation of the DC bias circuit 33 is suspended during the suspension period of the Main Link processing in the transmission apparatus 21, the power consumption can be decreased.

2. Second Embodiment

Next, referring to FIG. 4, a second embodiment of the present technology will be described.

[Configuration Example of Communication System 101]

Figure 4:
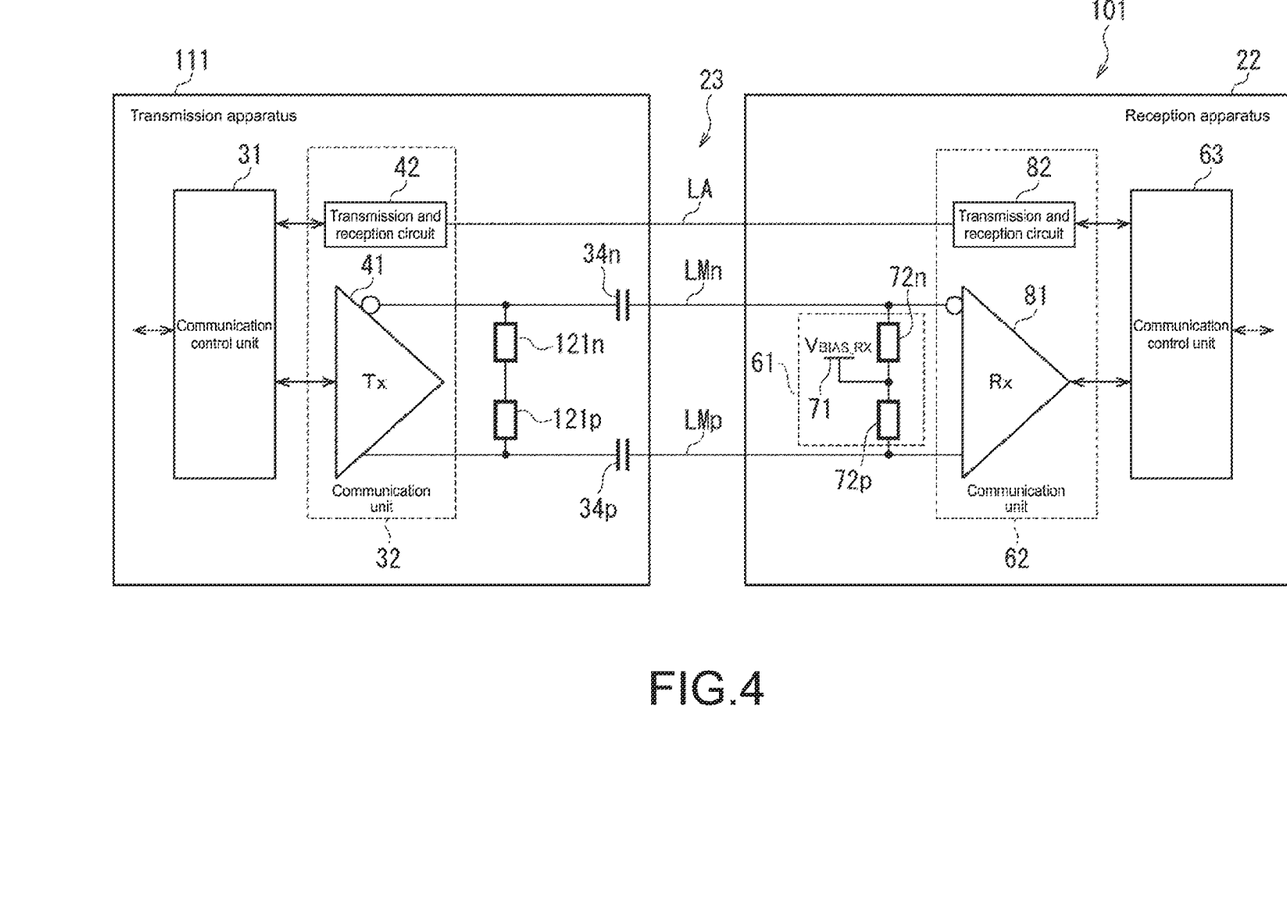
FIG. 4 is a block diagram showing a communication system according to a second embodiment to which the present technology is applied.

FIG. 4 shows a configuration example of a communication system 101 according to the second embodiment of the present technology. The components of FIG. 2 corresponding to those of FIG. 1 are denoted by the similar reference signs, and description thereof will be omitted as appropriate.

The communication system 101 is different from the communication system 11 of FIG. 1 in that a transmission apparatus 111 is provided in place of the transmission apparatus 21.

The transmission apparatus 111 is different from the transmission apparatus 21 in that resistances 121p and 121 are provided in place of the DC bias circuit 33. The resistance 121p and the resistance 121n are serially connected between the signal line LMp and the signal line LMn. Accordingly, the transmission apparatus 111 has a configuration that the power source 51 of the DC bias circuit 33 is substantially removed from the transmission apparatus 21.

As described above, the transmission apparatus 21 sufficiently charges the capacitances 34p and 34n by the charging signal before transmitting the ML_PHY_LOCK signal, and the transmission side potential of the signal lines LMp and LMn can reach the predetermined potential. Accordingly, even if the power source 51, which is used to maintain the transmission side potential of the signal lines LMp and LMn at a predetermined potential, is removed from the transmission apparatus 21 as in the transmission apparatus 111, the transmission between the transmission apparatus 111 and the reception apparatus 22 can be performed without problem.

3. Modifications

Hereinafter, modifications of the above-described embodiment of the present technology will be described.

The above description illustrates that the Main Link processing is suspended after the transmission apparatus 21 transmits the ML_PHY_SLEEP signal. Also, the present technology is applicable to the case that the Main Link processing is suspended after the transmission apparatus 21 transmits the ML_PHY_STANDBY signal. In the latter case, it is necessary to restore the reception apparatus 22 to the receivable state of the Main Link signal within 0.5 μseconds after the transmission of the AUX_PHY_WAKE signal. As described above, since the transmission side potential of the transmission apparatus 21 already reaches the predetermined potential at the time of the transmission of the AUX_PHY_WAKE signal is ended, the requirement can be satisfied.

Also, the present technology is applicable to a communication system or a communication method that has a function to suspend the transmission of the signal via an AC-coupled communication line in a case where no transmission data is present, other than the communication system or the communication method in conformity with the eDP standard.

Furthermore, the present technology is, for example, applicable not only to the case that the transmission of the differential signal is performed by the AC coupling, but also to the case that the transmission of the single end signal by the AC coupling.

In addition, for example, the present technology is applicable to the case that the signal is bi-directionally transmitted by the AC coupling.

Furthermore, the capacitances 34p and 34n are not necessarily provided on the transmission apparatus 21, and may be provided on the connection cables 23, for example.

The above-described series of processing can be executed by hardware or also by software. For example, all or parts of the processing by the communication control unit 31, the driver 41, the transmission and reception circuit 42, the communication control unit 63, the receiver 81, and the transmission and reception circuit 82 can be executed by hardware or also by software.

Also, in the present specification, the system means a group of a plurality of elements (apparatuses, modules (parts), and the like), and it does not matter whether or not all the elements are included in one housing. Accordingly, a plurality of apparatuses that are housed in separated housings and are connected via networks, and one apparatus including a plurality of modules housed in one housing each is defined as a system.

Furthermore, the embodiments of the present technology are not limited to the above-described embodiments. Various modifications and alterations may be available without departing from the spirit and scope of the present technology.

Also, the effects described in the present specification are merely illustrative and are not limitative, and may have an additive effect.

Furthermore, the embodiments of the present technology are not limited to the above-described embodiments. Various modifications and alterations may be available without departing from the spirit and scope of the present technology.

The present technology may also have the following configurations.

(1) A transmission apparatus, including:
a communication unit that transmits a signal via a first signal line and a second signal line to a reception apparatus, the reception apparatus being AC-coupled via the first signal line; and
a communication control unit that controls transmission of the signal to the reception apparatus,
the communication control unit controlling such that a first control signal is transmitted via the second signal line in a case where a transmission of the signal via the first signal line is restored from a suspended state, and that a transmission of a charging signal that charges an AC coupling capacitance serially connected to the first signal line via the first signal line is started before a timing when the transmission of the first control signal is ended.

(2) The transmission apparatus according to (1), in which
the communication control unit controls such that a second control signal is transmitted via the first signal line before the transmission of the signal via the first signal line is suspended.

(3) The transmission apparatus according to (2), in which
the transmission apparatus and the reception apparatus perform transmission of a signal in accordance with an Embedded DisplayPort standard,
the first control signal is an AUX_PHY_WAKE signal, and
the second control signal is an ML_PHY_SLEEP signal or an ML_PHY_STANDBY signal.

(4) The transmission apparatus according to any of (1) to (3), in which
the communication control unit starts transmissions of the first control signal and the charging signal at the same time.

(5) The transmission apparatus according to any of (1) to (3), in which
the communication control unit starts the transmission of the charging signal before a predetermined time to start the transmission of the first control signal or after a predetermined time from the start of the transmission of the first control signal.

(6) The transmission apparatus according to any of (1) to (5), in which
the communication control unit ends the transmissions of the first control signal and the charging signal at the same time.

(7) The transmission apparatus according to any of (1) to (6), further including:
a bias circuit that maintains potential of the first signal line at a transmission apparatus side from the capacitance at predetermined potential,
the bias circuit suspending an operation during a downtime of the transmission of the signal via the first signal line.

(8) The transmission apparatus according to any of (1) to (7), in which
the first signal line is constituted of a pair of two signal lines, and
the communication unit transmits a differential signal via the first signal line.

(9) The transmission apparatus according to any of (1) to (8), further including:
the capacitance.

(10) A transmission method, by a transmission apparatus connected to a reception apparatus via a first signal line and a second signal line and AC-coupled to the reception apparatus via the first signal line, including:
transmitting a predetermined control signal via the second signal line in a case where a transmission of the signal via the first signal line is restored from a suspended state; and
starting a transmission of a charging signal that charges an AC coupling capacitance serially connected to the first signal line via the first signal line before a timing when the transmission of the control signal is ended.

(11) A communication system, including:
a transmission apparatus; and
a reception apparatus connected to the transmission apparatus via a first signal line and a second signal line and AC-coupled to the transmission apparatus via the first signal line,
the transmission apparatus including
a communication unit that transmits a signal via a first signal line and a second signal line to the reception apparatus, and
a communication control unit that controls transmission of the signal to the reception apparatus,
the communication control unit controlling such that a first control signal is transmitted via the second signal line in a case where a transmission of the signal via the first signal line is restored from a suspended state, and that a transmission of a charging signal that charges an AC coupling capacitance serially connected to the first signal line via the first signal line is started before a timing when the transmission of the first control signal is ended.

REFERENCE SIGNS LIST 11 communication system
21 transmission apparatus
22 reception apparatus
23 connection cable
31 communication control unit
32 communication unit
33 DC bias circuit
41 driver
42 transmission and reception circuit
51 power source
61 DC bias circuit
62 communication unit
63 communication control unit
71 power source
81 receiver
82 transmission and reception circuit
LMp, LMn, LA signal line
1011 communication system
1111 transmission apparatus

The invention claimed is:
1. A transmission apparatus, comprising:
a communication circuitry configured to
transmit a signal to a reception apparatus via a first signal line, the reception apparatus being AC-coupled to the transmission apparatus via the first signal line, and
transmit a first control signal to the reception apparatus via a second signal line that is different than the first signal line; and a communication control circuitry configured to
 control transmission of the signal to the reception apparatus,
 determine whether the transmission of the signal to the reception apparatus will be restored from a suspended state,
 responsive to determining that the transmission of the signal to the reception apparatus will be restored from the suspended state, control the communication circuitry to transmit the first control signal via the second signal line, and
 control the communication circuitry to transmit a charging signal that charges an AC coupling capacitance serially connected to the first signal line via the first signal line before a timing when the transmission of the first control signal is ended.

2. The transmission apparatus according to claim 1, wherein
 the communication control circuitry is further configured to control the communication circuitry to transmit a second control signal via the first signal line before the communication control circuitry controls the communication circuitry to suspend the transmission of the signal via the first signal line.

3. The transmission apparatus according to claim 2, wherein
 the transmission of the signal to the reception apparatus is in accordance with an Embedded DisplayPort standard,
 the first control signal is an AUX_PHY_WAKE signal, and
 the second control signal is one of an ML_PHY_SLEEP signal or an ML_PHY_STANDBY signal.

4. The transmission apparatus according to claim 1, wherein
 the communication control circuitry is further configured to control the communication circuitry to transmit the first control signal and the charging signal at approximately the same time.

5. The transmission apparatus according to claim 1, wherein
 the communication control circuitry is further configured to control the communication circuitry to transmit the charging signal before a first predetermined time to a start the transmission of the first control signal or after a second predetermined time from the start of the transmission of the first control signal.

6. The transmission apparatus according to claim 1, wherein
 the communication control circuitry is further configured to control the communication circuitry to end the transmission of the first control signal and the transmission of the charging signal at approximately the same time.

7. The transmission apparatus according to claim 1, further comprising:
 a bias circuit configured to
 maintain a potential of the first signal line at a transmission apparatus side from a capacitance and at a predetermined potential, and
 enter a suspended state during a downtime of the transmission of the signal via the first signal line.

8. The transmission apparatus according to claim 1, wherein
 the first signal line is constituted of a pair of two signal lines, and
 the communication circuitry is further configured to transmit a differential signal via the first signal line.

9. The transmission apparatus according to claim 1, wherein the communication control circuitry is further configured to control the communication circuitry to transmit a second transmission of the signal to the reception apparatus after the timing when the transmission of the first control signal is ended, and
 wherein the second transmission is within 0.5 microseconds after the timing when the transmission of the first control signal is ended.

10. A transmission method, the method comprising:
 determining, with a communication control circuitry, whether a transmission of a signal from a communication circuitry to a reception apparatus via a first signal line will be restored to an active state from a suspended state;
 responsive to determining the transmission of the signal from the communication circuitry to the reception apparatus will be restored to the active state from the suspended state, controlling, with the communication control circuitry, the communication circuitry to transmit a predetermined control signal via a second signal line; and
 controlling, with the communication control circuitry, the communication circuitry to transmit a charging signal that charges an AC coupling capacitance serially connected to the first signal line via the first signal line before a timing when the transmission of the predetermined control signal is ended.

11. A communication system, comprising:
 a transmission apparatus; and
 a reception apparatus connected to the transmission apparatus via a first signal line and a second signal line and AC-coupled to the transmission apparatus via the first signal line,
 the transmission apparatus including
 a communication unit that transmits a signal via a first signal line and a second signal line to the reception apparatus, and
 a communication control unit that controls transmission of the signal to the reception apparatus, the communication control unit controlling such that a first control signal is transmitted via the second signal line in a case where a transmission of the signal via the first signal line is restored from a suspended state, and that a transmission of a charging signal that charges an AC coupling capacitance serially connected to the first signal line via the first signal line is started before a timing when the transmission of the first control signal is ended.

12. The transmission apparatus according to claim 11, wherein
 the communication control unit is further configured to control the communication unit to transmit a second control signal via the first signal line before the communication control unit controls the communication unit to suspend the transmission of the signal via the first signal line.

13. The transmission apparatus according to claim 12, wherein
 the transmission of the signal to the reception apparatus is in accordance with an Embedded DisplayPort standard,
 the first control signal is an AUX_PHY_WAKE signal, and
 the second control signal is one of an ML_PHY_SLEEP signal or an ML_PHY_STANDBY signal.

14. The transmission apparatus according to claim 11, wherein the communication control unit is further configured to control the communication unit to transmit the first control signal and the charging signal at approximately the same time.

15. The transmission apparatus according to claim 11, wherein the communication control unit is further configured to control the communication unit to transmit the charging signal before a first predetermined time to a start the transmission of the first control signal or after a second predetermined time from the start of the transmission of the first control signal.

16. The transmission apparatus according to claim 11, wherein the communication control unit is further configured to control the communication unit to end the transmission of the first control signal and the transmission of the charging signal at approximately the same time.

17. The transmission apparatus according to claim 11, further comprising:

a bias circuit configured to
maintain a potential of the first signal line at a transmission apparatus side from a capacitance and at a predetermined potential, and
enter a suspended state during a downtime of the transmission of the signal via the first signal line.

18. The transmission apparatus according to claim 11, wherein the first signal line is constituted of a pair of two signal lines, and
the communication unit is further configured to transmit a differential signal via the first signal line.

19. The transmission apparatus according to claim 11, wherein the communication control unit is further configured to control the communication unit to transmit a second transmission of the signal to the reception apparatus after the timing when the transmission of the first control signal is ended, and wherein the second transmission is within 0.5 microseconds after the timing when the transmission of the first control signal is ended.

* * * * *